United States Patent

Hemdal et al.

[15] 3,644,895

[45] Feb. 22, 1972

[54] BUFFER STORE ARRANGEMENT FOR OBTAINING DELAYED ADDRESSING

[72] Inventors: Goran Anders Henrik Hemdal, Tyreso; Nils Bertil Lennmarker, Handen, both of Sweden

[73] Assignee: Telefonaktiebolaget LM Ericsson, Stockholm, Sweden

[22] Filed: Feb. 5, 1970

[21] Appl. No.: 8,937

[30] Foreign Application Priority Data

Feb. 18, 1969 Sweden ....................2240/69

[52] U.S. Cl. ....................340/172.5

[51] Int. Cl. ....................G06f 13/00, H04q 3/54

[58] Field of Search ....................340/172.5

[56] References Cited

UNITED STATES PATENTS

| | | | |
|---|---|---|---|
| 3,056,113 | 9/1962 | Smith | 340/172.5 X |
| 2,815,168 | 12/1957 | Zukin | 340/172.5 X |
| 2,881,411 | 4/1959 | Newmann et al. | 340/172.5 X |
| 2,982,946 | 5/1961 | Shugart | 340/172.5 |
| 3,003,137 | 10/1961 | Kurkjian et al. | 340/172.5 |
| 3,153,776 | 10/1964 | Schwartz | 340/172.5 |
| 3,218,611 | 11/1965 | Kilburn et al. | 340/172.5 |
| 3,299,406 | 1/1967 | Isberg | 340/172.5 |
| 3,343,136 | 9/1967 | Nyberg | 340/172.5 |

OTHER PUBLICATIONS

Calta, S. A. and Kaumeyer, L. W.; " Maintaining Sequences of Randomly Assigned Buffers" ; IBM Technical Disclosure Bulletin; Vol. 9, No. 7, Dec, 1966; pp. 823–825

*Primary Examiner*—Paul J. Henon
*Assistant Examiner*—Melvin B. Chapnick
*Attorney*—Hane & Baxley

[57] ABSTRACT

A buffer store arrangement in a data controlled telecommunication system for delaying by a predetermined number of periods of a clock frequency the addressing of addresses separated by a restoration value. The arrangement comprises store cells with registering circuits and restoration circuits in the input side and reading circuits on the output side, a registering counter, a reading counter and a clock pulse generator. Each restoration circuit is connected to the clock pulse generator so that the restoration value is registered before the registering counter is activated. A data processor has an input register, which on its output is connectable to the registering circuits for registering data in a certain cell and to the registering counter for stepping at registering, and an output register. By setting the registering and reading counters so that they point out cells separated by a certain number of cells containing the restoration value, the desired delay is obtained which corresponds to the product of the clock pulse period and the said predetermined number of cells.

1 Claims, 9 Drawing Figures

Figure 1:
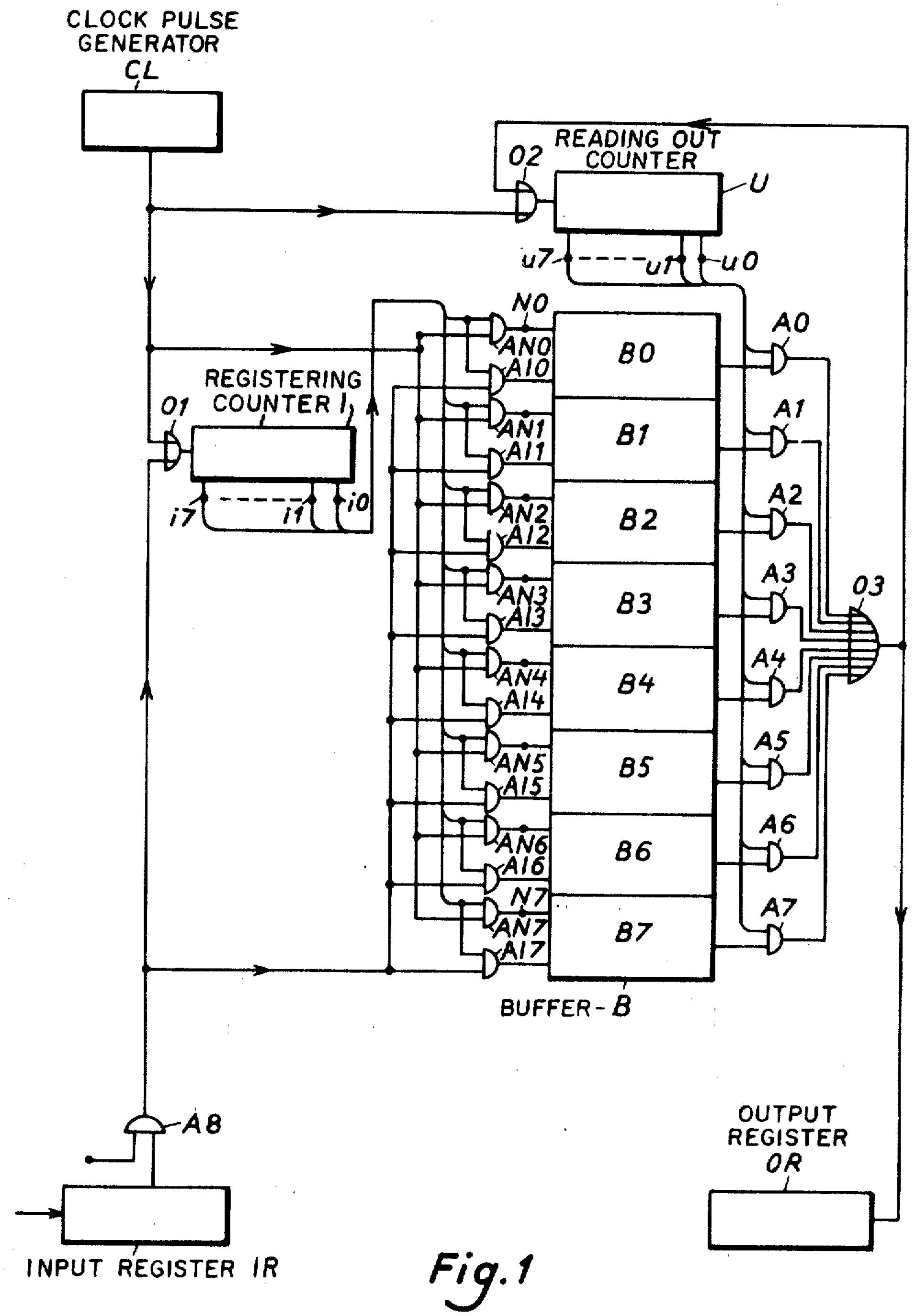

INVENTORS
Göran Anders Henrik Hemdal
Nils Bertil Lennmarker
BY Hane and Baxley
ATTORNEYS INVENTORS
GÖRAN ANDERS HENRIK HEMDAL
NILS BERTIL LENNMARKER
BY Hane and Baxley
ATTORNEYS

BUFFER STORE ARRANGEMENT FOR OBTAINING DELAYED ADDRESSING

The present invention relates to a buffer store arrangement in a stored program controlled telecommunication system wherein data passing through the buffer store is delayed.

In a telecommunication system the significance of a signal is often determined by its length. In order to determine whether a signal duration is longer or shorter than a predetermined length of time, relays are used in conventional systems, the operation of the relays being delayed by a time which is longer than the shorter duration but shorter than the longer duration. If, thus a short signal i.e., a signal having the shorter duration is supplied to the relay, the relay will not have the time to operate before the signal ceases, while if the signal is received having a duration which is longer than the duration of a short signal the relay is operated. To make this method work in a satisfactory way it is however required that each relay be adjusted extremely accurately, which causes considerable costs. In a stored program controlled telecommunication system these delays are operating digitally in the controlling computer by delaying the addressing of a device and after the delay it is examined whether the signal remains, before the device is activated. Several methods have been proposed for obtaining the timing required for obtaining the correct delay time. A first method implies that a timing word and a particular marking bit are associated with the address of each device in the data store of the computer. The timing being carried out by the marking bit being set to one and a certain number registered in a timing word. Thereafter a periodically repeated program searches all marking bits and when a one-set bit is found the number in the timing word is reduced by one. The device is addressed when the timing word is set to zero after a number of reductions. In order to make this timing accurate it is of course required that the scanning of the marking bits takes place sufficiently often, which implies a considerable traffic independent load in the computer, as all the marking bits must always be examined. Furthermore this method requires a very extensive store.

A second method consists in using a central clock register, which is stepped forward with a certain frequency. In associating with each device there is a clock comparison word which, upon the initiating of a timing is given a value corresponding to the current value of the clock register plus the number of periods of the clock frequency which the timing is to comprise. Each time when the clock register has been stepped forward a comparison takes place between the contents of the clock register and all the clock comparison words. If identity is found the address belonging to the clock comparison word is addressed, after which the clock comparison word is given a value which the clock register cannot accept, so that no unwanted addressing is performed. This method has the advantage that the stepping forward is carried out centrally at the clock register. The traffic independent load will however be larger than for the previously described method and the store requirements are reduced only by a very small extent.

A third method implies that a number of store fields, which are cyclically scanned by a periodically repeated program, are arranged in the data store, i.e., the program scans the store fields with a determined pause between the scanning of one field and the succeeding one, and continues the scanning of the first field, when the last field has been scanned. If then the number of bits in each store field corresponds to the number of devices, where timing may occur, and a certain bit position corresponds to the same device in all the store fields. A time delay may be obtained when a bit appertaining to a certain device is set to one in the store field, which will be scanned by the periodically scanning program after a time corresponding to the wanted timing. The program upon each store field scanning carrying out an addressing of devices corresponding to one-set bits in the store field. The great disadvantage of this method is the very large store required since each bit field is just as large as the number of devices and the number of bit fields is determined by the time which the longest timing takes and the accuracy required. Furthermore the traffic independent load will be large, as when using the two previously described methods since, in each bit field all bits must be scanned independent of whether timing is going on or not.

A known method, by which the traffic independent load is considerably reduced, implies that an addressing word is associated with each device, in which addressing word the address of another device can be registered. Hereby it is possible to register in the addressing word of a device the address of another device which is to be addressed at the same point of time as the first mentioned device and in a corresponding way to register the address of a third device in the addressing word of the second device etc., whereby at a certain point in time a chain of addressings is obtained. The address of the first device in this chain is then registered in a determined position of a list, in which the addresses are read successively and at certain time intervals, whereby the address of a certain device is inserted in the chain, the first device of which in the list is addressed after a time interval corresponding to the wanted delay of a number of time spaces. By means of this method only those device will be addressed, for which timing takes place, whereby the traffic independent load is reduced. The required store space, one word for each device, will however be very large.

The last-mentioned method may also be modified in that, instead of the chain addressing, a number of buffer register units are used, whereby in each buffer unit addresses are registered to devices that are to be addressed at a certain point in time and the buffer unit is scanned in the same way as the above-mentioned list. Hereby it will not be necessary that each address is given an addressing word. No advantage concerning the required store space will however be obtained, as each buffer must be dimensioned so that the risk of the buffers being filled and blocked will not be too great.

The present invention is intended to provide a store arrangement for obtaining a delayed addressing which only requires one buffer unit for carrying out the timing in all devices with the same delay, whereby the required store space as well as the traffic independent load will be considerably smaller than at the above described methods. The characteristics of the invention will then appear in the claim following after the description.

The invention will be more fully described with reference to the accompanying drawings, in which FIG. 1 shows a block diagram of an arrangement according to the invention and, FIGS. 2*a*–2*h* show examples arrangement will at of the conditions of units comprised in the arrangement according to FIG. 1 at various points of time. The arrangement will at first be briefly described with reference to FIG. 1 and then in more detail by means of the state diagram according to FIG. 2.

In FIG. 1 reference B denotes a buffer store, which for the sake of clearness only comprises 8 store cells B0–B7, in which store cells address information may be registered via a number of AND-gates A10–A17 and read via a number of AND-gates A0–A7, each of which symbolizes a number of parallel gates. The cells of the buffer store can be words of a conventional magnetic core memory. The contents of the store cells may furthermore be set to zero via a number of AND-gates AN0–AN7 connected to zero-setting inputs N0–N7. The arrangement furthermore comprises a clock pulse generator CL, a high-precision free-running oscillator or square wave generator, generating clock pulses with a determined clock frequency. The clock pulses first step the registering counter I, a conventional step counter, forward via an OR-gate 01, so that the number of outputs *i*0–*i*7 of the registering counter corresponding to the number of store cells are successively and cyclically activated and thereby in pairs opens the gates A10–A17 and the gates AN0–AN7 respectively, by way of connections to first inputs thereof secondly in a corresponding way stepping a reading counter U, another conventional step counter, forward via an OR-gate 02, the outputs *u*0–*u*7 of the reading counter U being successively and cyclically activated and thereby opening the AND-gates A0–A7. The clock pulse generator is also connected to the other input of each of the gates AN0–AN7 connected to the zero-setting inputs of the store cells, whereby a clock pulse sets the contents of the store cell pointed out by the registering counter I to zero. The other input of each the gates A10–A17 is connected to the output of an input register IR a conventional flip-flop register via an AND-gate array A8, whereby address information may be registered from the register in the store cell pointed out by the registering counter I. This address information which comes from a central processing unit (not shown) of course consists of several binary bits, which are transmitted via a number of parallel conductors and gates, which, as has been mentioned previously, for the sake of clearness, are symbolized by one conductor and one gate respectively. This conductor is also connected to the other input of the OR-gate 01, whereby registering of address information causes the counter I to be stepped forward. The outputs of the reading gates A0–A7 are connected firstly to an output register OR, a conventional flip-flop register, via an OR-gate 03, in which output register addresses registered from the input register can be transmitted with a certain delay as will be explained in connection with FIG. 2, secondly to the other input of the OR-gate 02, whereby reading of an address causes the reading counter to be stepped forward. Output register OR is connected to the central processing unit. The operation of the arrangement will now be closer described in connection with FIG. 2.

Figure 2A:
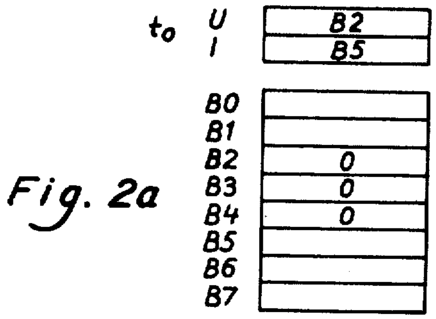
Figure 2E:
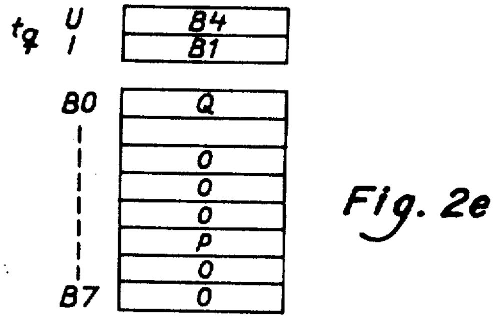
Figure 2B:
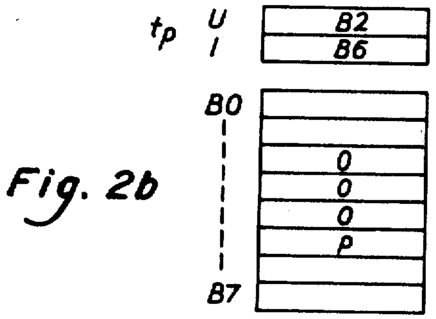

In FIGS. 2*a*–2*b* there is shown the contents in the buffer unit B as well as the store cells when pointed out by the registering counter I and the reading counter U at various points in time, which are indicated to the left of the respective figures. The points of time *t*0, *t*1, *t*2 . . . *t*5 then indicate the occurrence of clock pulses from the clock pulse generator CL, while the references *tp* and *tq* respectively indicate points of time for registering address information in the store cells, i.e., the points of time when the gate A8 is opened.

Figure 2F:
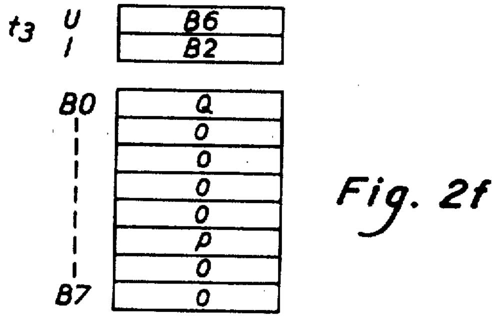
Figure 2C:
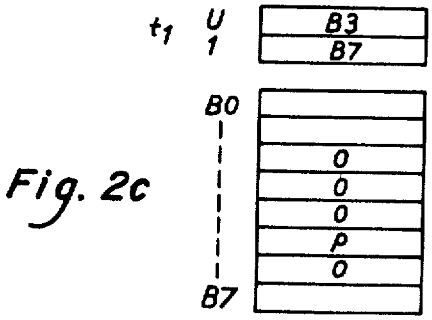
Figure 2G:
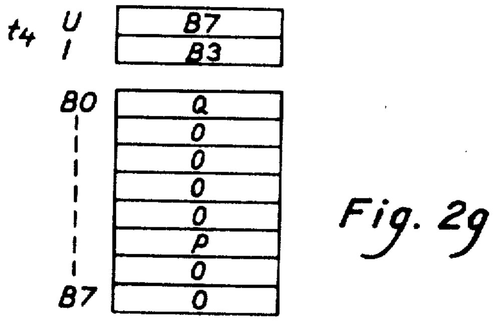
Figure 2D:
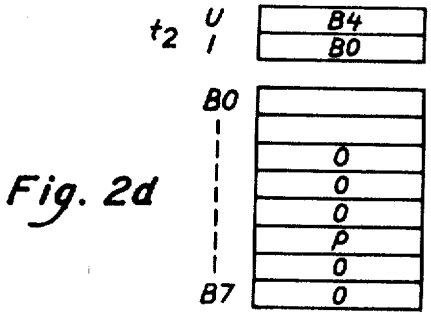
Figure 2H:
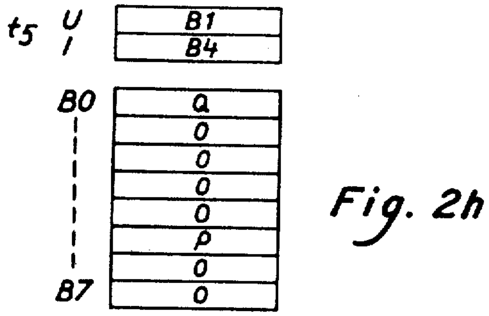

After the clock pulse which has stepped the counters I and U forward at the point of time *t*0, it is assumed that the arrangement is in the condition shown in FIG. 2*a*. The counter U thus points out the cell B2 and the counter I points out the cell B5. In the buffer unit B the cells B2, B3 and B4 are set to zero. The contents of the other cells are of no importance for explaining the operation of the arrangement. At the point of time *tp* the address P, which is presumed to differ from 0, is transmitted from the register IR to the buffer unit B. This address will then be registered in the store cell B5, pointed out by the counter I, at the same time as the registering causes the counter to be stepped forward by one step from the OR-gate 01, whereby the condition shown in FIG. 2*b* is obtained. At the point of time *t*1 a new clock pulse is obtained, whereby at first the cell B6 pointed out by the counter I is set to zero and then the counters I and U are stepped forward, the condition according to FIG. 2*c* being obtained. This process is repeated at the point of time *t*2, whereby in a corresponding way the condition according to FIG. 2*d* is obtained. At the point of time *tq* it is presumed that a new registering takes place from the register IR, the address in said register being presumed to be Q. This address will be obtained in the store cell B0 pointed out by the counter I, the registering causing the counter to be stepped forward in the same way as previously. Hereby the condition shown in FIG. 2*e* is obtained. At the point of time *t*3 a new clock pulse is obtained, which again has as a result that the counters are stepped forward and the cell B1, which was pointed out by the counter I before the stepping forward, is set to zero. The stepping forward of the counter U however causes the cell B5, in which the address P is registered, to be pointed out. Hereby an output signal is obtained from this cell across the OR-gate 03, firstly to the register OR in which the address is obtained, secondly to the other input of the gate 02, whereby the counter U is stepped forward by one further step. The condition in the buffer unit after these processes is shown in FIG. 2*f*. Except for the changes in the counters U and I the address P has thus been obtained at this point of time in the register OR, which is presumed to be connected to the data store of the computer in such a way that an address obtained in the register is immediately addressed. The address P has been obtained from the register IR at the point of time *tp* and the delay obtained by means of the buffer unit is thus two whole periods of the clock pulse frequency. As could be realized the number of periods depends on how many zero-set cells there are between the cell pointed out by the counter U and the cell pointed out by the counter I at the beginning of the process, because this number then remains the same. In FIG. 2*g* is shown the condition obtained after the clock pulse occurring at the point of time *t*4. As has been shown this pulse only causes the counters I and U to be stepped forward by one step. At the point of time *t*5 the stepping forward of the counter U causes the store cell B0 to be pointed out. In the store cell B0 the address Q is however registered, and so this address is in the same way as the address P read to the register OR at the same time as the counter U is stepped forward by one further step. Hereby the condition shown in FIG. 2*h* is obtained. Also concerning the address registered at the point of time *tq* a delay is thus obtained comprising two whole pulse periods from when the address is registered in the buffer unit until it is read from it.

Concerning the operation of the buffer unit it should further be pointed out that it might of course happen, that the buffer unit becomes completely filled wherein the number of registered but not read addresses plus the required number of zeros will be just as large as the number of cells. This implies that the registering counter I is stepped forward so that it points out the same cell as the reading counter U. For preventing the registering of further addresses it is possible to complete the arrangement according to FIG. 1 with a comparison circuit which compares the setting of the two counters and blocks the gate A8 upon identity.

By means of the arrangement according to the invention all the wanted time delays of a certain length may thus be obtained by means of one single buffer unit, whereby the required store space will be considerably smaller than at the methods mentioned in the introduction, where several buffer units were required, as thereby each buffer unit has to be dimensioned so that the risk for blocking will not be too big. Furthermore the use of one single buffer unit results in the traffic independent load becoming considerably smaller. The fact that only one delay time is obtained furthermore constitutes no disadvantage, since, as a rule, the same delay time is wanted for a large number of devices, the addresses of which may thus be associated with the same buffer unit.

We claim:

1. In a stored program controlled telecommunication system, wherein the operation of a plurality of devices each having its own address is carried out with a time delay consisting of a predetermined number of periods of a clock frequency and the values of the addresses of said devices are distinguished from a definite value, a buffer store arrangement for storing any of said addresses and providing that any stored address is read out automatically after said time delay, comprising in combination a plurality of store cells for said storing, registering gate means and reading gate means associated with inputs and outputs respectively of said store cells, a registering counter and a reading counter each having forward stepping inputs and outputs arranged to open cyclically said registering and reading gate means respectively for effecting registering into said store cells and read out from said store cells respectively of said addresses, means connecting the inputs of said registering gate means and the outputs of said reading gate means with the forward stepping inputs of said registering and reading counters respectively for effecting forward stepping of said counters upon each said registering and each said read out respectively, said buffer store arrangement further comprising a clock pulse generator means supplying pulses at said clock frequency and being connected to said forward stepping inputs of said counters for effecting forward stepping of said counters independently of said forward stepping upon said registering and said read out, reset gate means associated with reset inputs of said store cells and having each an input connected to said clock pulse generator, the outputs of said registering counter being further connected to said reset gate means and arranged to open cyclically said reset gate means for effecting upon the occurrence of said pulses from said clock pulse generator resetting of the respective store cells selected by said registering counter to a definite value, second reading gate means having inputs connected with said outputs of said reading gate means and having an output for transferring from the respective store cells selected by said reading counter stored addresses whose values are different from said definite value, and said counters being preset in such a way that the respective store cells selected by said counters are at any instant separated by a predetermined number of store cells whose contents have said definite value and the predetermined number of which being said predetermined number of periods of said clock frequency.

* * * * *